INVENTOR
JOHN KUNZ

May 18, 1954 J. KUNZ 2,678,602
DRIVE AND BRAKE SYSTEM FOR PRINTING PRESSES AND THE LIKE
Filed Sept. 29, 1948 4 Sheets-Sheet 2

INVENTOR
JOHN KUNZ
By Hoopes, Leonard & Glenn
his attorneys

Patented May 18, 1954

2,678,602

UNITED STATES PATENT OFFICE 2,678,602

DRIVE AND BRAKE SYSTEM FOR PRINTING PRESSES AND THE LIKE

John Kunz, Pittsburgh, Pa., assignor to Miller Printing Machinery Co., Pittsburgh, Pa., a corporation of Pennsylvania Application September 29, 1948, Serial No. 51,752

3 Claims. (Cl. 101—247)

This invention relates to a drive and brake system for a power drive printing press or the like.

The customary power drive for a printing press consists of a large variable speed electric motor connected to the drive shaft of the press by a silent chain drive. The shaft driven by the silent chain drive has a flywheel mounted on it and a brake shoe is mounted to act against the periphery of the flywheel. When the brake is applied a limit switch turns off the variable speed motor and when the brake is released the limit switch turns on the variable speed motor. A constant speed motor is connected to drive the blower pump and tape delivery continuously while the press is in operation, independently of the operation of the variable speed motor.

The conventional drive has the disadvantage that the large variable speed motor is more expensive than a constant speed motor and the additional motor to drive the tape delivery and blower adds to the expense. Moreover, the variable speed motor does not develop its full power when inching the press at low speeds, and consequently a variable speed motor with enough power to inch the press without stalling is likely to be overpowered for the purpose of driving the press at normal speeds.

The drive system according to my invention employs only one motor, which is of the constant speed type. The motor drives the flywheel shaft through a friction belt and stepped pulley drive which is of low cost and also has the advantage of providing a clutching action so that the motor may be run at its normal speed while inching the press. The belt may be shifted on the stepped pulleys to vary the speed of the press for different jobs. The motor runs at its normal speed while the press is in use whether the main drive of the press is being driven or not, and hence the blower pump and tape delivery are driven directly from the shaft of the motor which drives the press.

In conjunction with the drive system of my invention, I provide braking means interconnected with the drive system so that the brake is disengaged when the press is being driven through the belt and pulleys, and the brake is applied when the belt is loosened to disengage the driving connection between the pulleys. In the conventional drive and brake system the motor shaft and drive shaft are always in driving engagement, and the brake has to act against the momentum of the motor armature after the motor is switched off as well as against the momentum of the other parts of the press. My brake does not have to act against the momentum of the motor armature because when the brake is applied to stop the press, the motor is disengaged from the parts of the drive controlled by the brake.

Further novel features and advantages of the drive and brake system of my invention will become apparent from the following detailed description and in the accompanying drawings. I have shown in the drawings, for purposes of illustration only, the following preferred embodiment of my invention, in which:

Figure 2 is a side elevation of the press shown in Figure 1, with the drive disengaged and the brake on;

Figure 3:
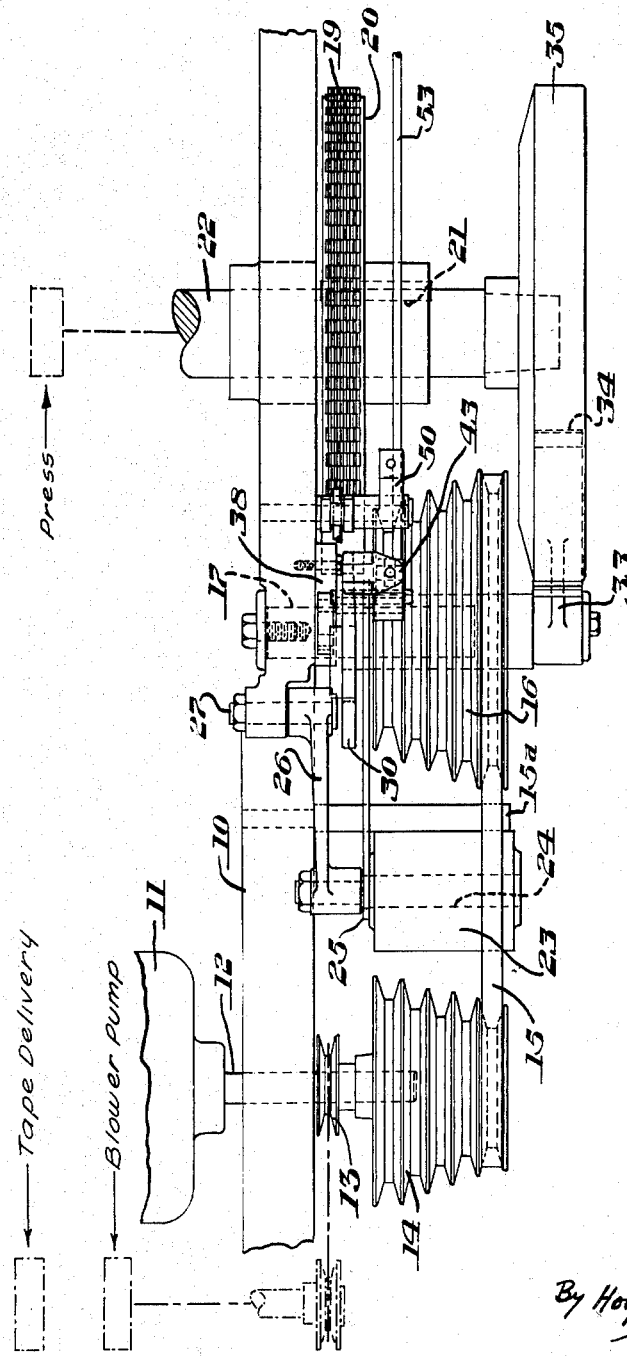
Figure 3 is a top plan view of the press shown in Figure 1 with a portion of the side frame broken away and the hand control lever omitted in order to show the linkage of the drive and brake system.
Figure 4:
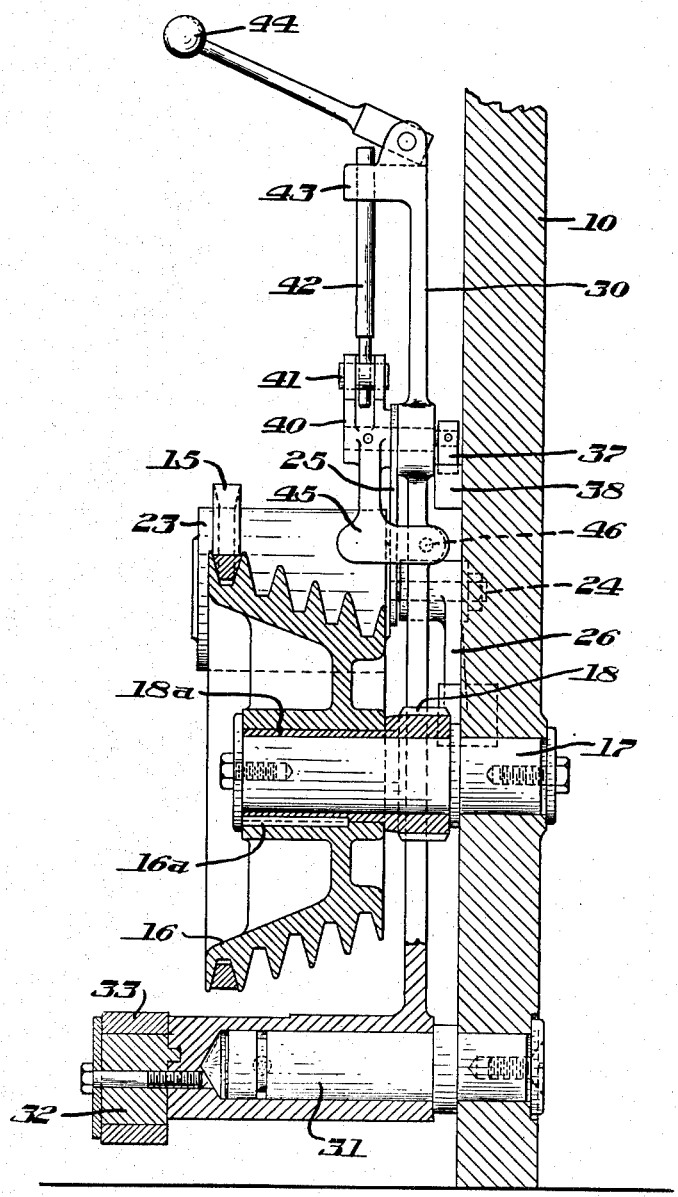
Figure 4 is a sectional view on the line IV—IV in Figure 1.

Referring in detail to the drawings, I provide the side frame member 10 of a press and a constant speed electric motor 11 to drive the press. The motor 11 has a drive shaft 12 on which is mounted a small pulley 13 and a stepped pulley 14. The small pulley 13 drives the blower pump and tape delivery through a V-belt (shown diagrammatically in Figure 3).

A V-belt 15 on pulley 14 transmits power from the motor 11 to drive the press. The belt 15 drives a stepped pulley 16 and a stud 15a on the frame 10 supports the lower pass of the belt 15 when the belt is slack. A shaft 17 rotatably mounts a pinion 18. A sleeve 18a extends from the pinion 18 over the shaft 17 and the pulley 16 is mounted on and secured by a key 16a to the sleeve 18a. The pinion 18 through a silent chain 19 drives a pinion 20 mounted on and secured by a key 21 to a drive shaft 22. The power of the motor 11 is thus transmitted through shaft 12, pulley 14, V-belt 15, pulley 16, pinion 18, silent chain 19 and pinion 20 to the drive shaft 22, which is the main drive shaft from which all parts of the press other than the blower pump and tape delivery are driven.

The transmission of power by the V-belt 15 from the pulley 14 to the pulley 16 depends upon frictional engagement by the belt 15 on the pulleys 14 and 16. The frictional engagement depends upon the tightness of the belt 15 on the pulleys 14 and 16, which is controlled by an idler pulley 23 positioned between the pulleys 14 and 16 and adapted to engage the under surface of the upper reach of the belt 15. The idler pulley 23 is rotatably mounted on a shaft 24 which is secured to one end of an arm 25 and is pivotally attached to one end of an arm 26. The other end of the arm 26 is pivotally mounted on a stud 27 secured to the frame 10. The other end of the arm 25 is pivotally mounted on a pin 28. The pin 28 also pivotally mounts a group of integral control members generally designated 29, and is carried by a drive control arm 30. The length of the arm 25 may be made adjustable by any convenient means (not shown) so that the topmost position of the pulley 23 may be adjusted for variations in the length of the belt 15.

Figure 1:
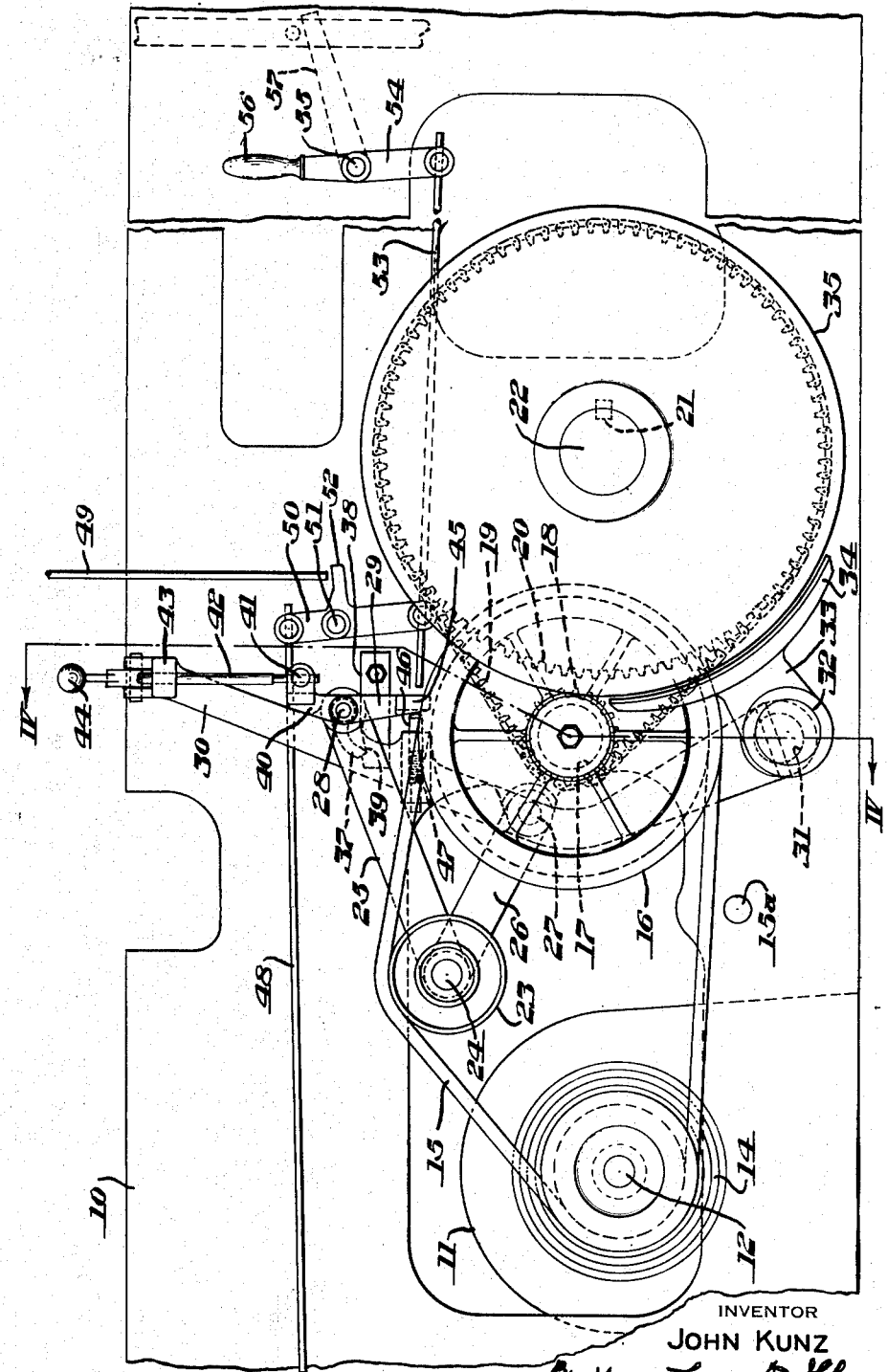
Figure 1 is a side elevation of a press incorporating my invention, with the drive engaged and the brake off.
Figure 2:
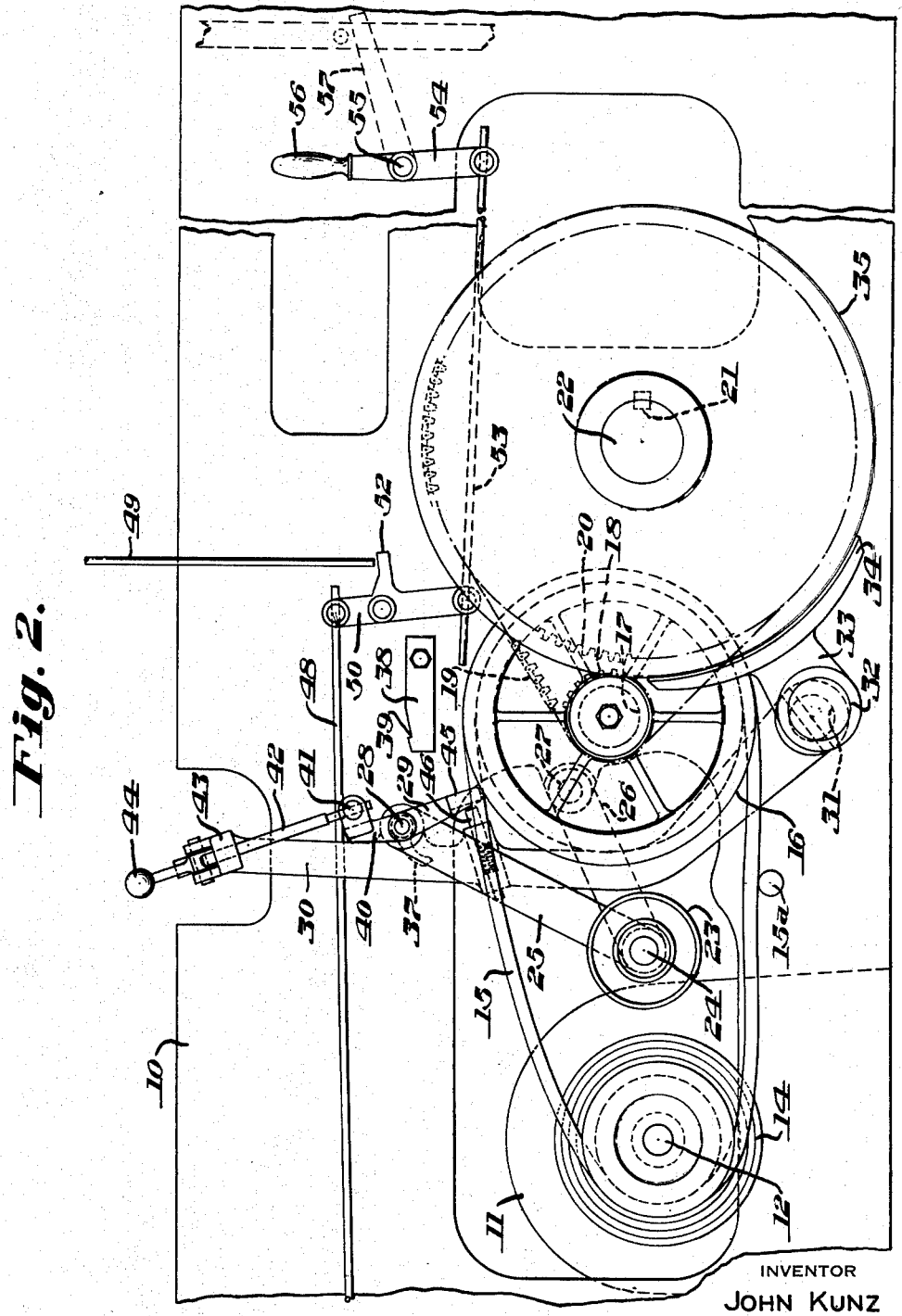

The drive control arm 30 is pivotally mounted on a stud 31 secured to the frame 10. A pin 32 is secured to the arm 30 adjacent to the stud 31 with its axis offset from the axis of the stud 31. The pin 32 pivotally mounts an arm 33 which carries a brake shoe 34. This brake shoe is adjacent the periphery of a flywheel 35 secured to the drive shaft 22 and the shoe is applied to said periphery when the drive control arm 30 pivots counterclockwise (as shown in Figures 1 and 2) on the stud 31 and moves the offset pin 32 toward the flywheel 35. When the drive control arm 30 pivots counterclockwise and applies the brake, the pin 28 mounted on the arm 30 and carrying one end of the arm 25 causes the arm 25 to move generally counterclockwise relative to the stud 31. This causes the shaft 24 carrying the idler pulley 23 also to move counterclockwise relative to the stud 31 and thereby causes the arm 26 engaging the shaft 24 to pivot counterclockwise on its fixed stud 27. As a result, the idler pulley 23 is caused to swing inwardly between the pulleys 14 and 16, thus relieving the tension imposed by the idler pulley 23 on the V-belt 15. The effect of relieving this tension is to disengage the driving connection between the motor shaft 12 and the press drive shaft 22. This disengagement occurs at the same time that the brake is applied, because both actions are caused by counterclockwise movement of the drive control arm 30 on its fixed stud 31.

Conversely, clockwise movement of the drive control arm 30 on its fixed stud 31 releases the brake and tightens the belt 15 to establish a driving connection between the motor shaft 12 and the drive shaft 22. The motor 12 continues to run at its constant speed regardless of the movement and action of the control arm 30 and consequently the pulley 13 on the motor shaft 12 drives the blower pump and tape delivery continuously while the motor 11 is in operation regardless of whether the main drive shaft 22 is being driven.

A group of integral control members 29 are pivotally mounted on the pin 28 carried by the drive control arm 30 in order to control the pivotal movement of the drive control arm 30 on its stud 31. The members 29 comprise a pawl 37 adjacent a rack 38 secured to the frame 10. The rack has an indented catch 39 to engage and hold the pawl 37 against lateral movement in a direction generally counterclockwise of the stud 31.

The control members 29 further comprise a laterally extending arm 40 having forked ends. A horizontal pin 41 is rotatably mounted between the forked ends of the arm 40 and the lower end of a rod 42 is secured to the pin 41. The rod 42 extends slidably through a bracket 43 on the upper end of the drive control arm 30, and the upper end of the rod projects above the bracket 43. A hand lever 44 is pivotally mounted on the top of the arm 30 and extends over the upper end of the rod 42 so that when the lever 44 is swung down it will press down on the upper end of the rod 42, which will cause the pin 41 and the control members 29 to pivot clockwise on the pin 28. This clockwise movement of the members 29 lifts and disengages the pawl 37 from the catch 39 and thereby permits the control arm 30 carrying the pawl 37 to pivot counterclockwise on the stud 31. The weight of the idler pulley 24 serves to pull the arm 30 counterclockwise on the stud 31 when the arm 30 is in an approximately vertical position, and after the arm 30 has moved counterclockwise from its vertical position the weight of the arm 30 and the weight of the members carried by the arm 30 increase the force tending to pivot the arm 30 counterclockwise on the stud 31.

The group of integral control members 29 also comprises a downwardly extending tongue 45. A rod 46 slidably mounted on the drive control arm 30 and actuated by a compression spring 47 presses against the tongue 45 and resiliently urges it to pivot counterclockwise around the pin 28. Such counterclockwise movement of the tongue 45 tends to pivot the pawl 37 against the rack 38 and to hold the pawl 37 against the catch 39 after the pawl has engaged said catch. The tongue 45 pivots clockwise on the pin 28 against the action of the rod 46 and spring 47 when the hand lever 44 is pressed down as described above, and the tongue 45 also moves in a clockwise direction when actuated by other control members of the press.

Control members are customarily provided at the delivery end of the press and at the loading end of the press, and a control member also extends from the stripper finger trip mechanism of the press. As shown in Figures 1 and 2, a control member 48 extends from the delivery end (not shown) of the press and a control member 49 extends from the stripper finger trip mechanism (not shown) of the press. The member 48 is pivotally connected to the upper end of a link 50 which is pivotally mounted on a stud 51 fixed to the frame 10. The control member 49 is adapted to press against an arm 52 secured to the link 50. The lower end of the link 50 is pivotally connected to a rod 53. On one side of the link 50 the rod 53 extends adjacent the tongue 45 and on the other side of the link 50 the rod 53 extends and is pivotally connected to a lever 54 pivotally mounted on a stud 55 secured to the frame 10. The lever 54 may be controlled through a handle 56 and may also be controlled by a member 57 extending from the loading end (not shown) of the press. The rod 53 is thus carried by the link 50 and lever 54 for movement toward or away from the tongue 45 and this movement may be controlled by movement of any one of the members 48, 49, 56 and 57. When the rod 53 moves against the tongue 45 and causes it to pivot clockwise, the pawl 37 is released from the catch 39 and the drive control arm 30 then swings counterclockwise to apply the brakes and declutch the motor, in the manner described above.

The operation of my driving mechanism is as follows. When the motor 11 is driving the main drive shaft 22 and it is desired to stop the press, the operator can either pull down on the hand lever 44 or else operate the controls at the delivery or loading end of the press through the members 48 or 57. In either case, the effect will be to release the drive control arm 30 to swing counterclockwise through the action of gravity, without any additional force supplied by the operator, and thereby to disengage the motor and apply the brake. When it is desired to re-engage the motor to drive the press and to release the brake, the operator has only to grasp the hand lever 44 and pull it toward the loading end of the press until the pawl 37 is engaged by the catch 39. It will be observed that only one action of the operator is necessary to perform the function of engaging the motor and releasing the brake, or vice versa.

When the drive control arm 30 is released to disengage the motor and apply the brake, the motor 11 is no longer drivably connected with the flywheel 35 and hence the brake shoe 34 does not have to act against the angular momentum of the armature of the motor. This is advantageous as compared with the conventional drive, where the principal motor is in permanent driving engagement with the main drive shaft and consequently the brake has to overcome the momentum of the motor armature as well as the momentum of the flywheel on the main drive shaft when the brake is applied and the motor is simultaneously switched off.

When it is desired to turn the press through only a fraction of its printing cycle, the drive control arm 30 is pulled by the hand lever 44 from its released position toward the loading end of the press until the idler pulley 23 partially tightens the belt 15. The degree of tension on the belt 15 may be controlled by the pull on the drive control arm 30 and in this way a varying amount of friction between the belt 15 and the pulleys 14 and 16 may be obtained. In this manner the pulley 14 may be driven continuously at constant speed while the pulley 16 is driven through the belt 15 at varying rates and for varying periods, depending upon the amount of slippage permitted between the belt 15 and pulleys 14 and 16. While the press is being inched in this manner, the motor 11 continues to rotate at its normal constant speed and hence it is able to transmit its full power to the pulley 16 as the belt 15 is tightened or loosened on the pulleys 14 and 16.

Since the motor 11 is connected to drive the main drive shaft 22 at varying speeds or intermittently while the motor 11 continues to operate at a constant speed, the tape drive and blower pump can be driven from the pulley 13 on the motor shaft 12 continuously and at a constant speed instead of being driven from a separate constant speed motor.

Although I have illustrated and described a preferred embodiment of the invention, it will be recognized that changes in the details and arrangements may be made without departing from the spirit of the invention or the scope of the appended claims.

I claim:

1. A printing or like press comprising a power input shaft which rotates continuously during use of the press, work conveyor means, a connection from the power input shaft to the work conveyor means for driving the work conveyor means continuously, a main press drive shaft which rotates intermittently and at variable speeds independently of the work conveyor means during operation of the power input shaft, and driving connection and control means between the power input shaft and the main drive shaft comprising a pulley driven by the power input shaft, a pulley connected to rotate the main drive shaft, a friction drive belt passing around said pulleys, an idler pulley disposed beneath a substantially horizontal portion of the drive belt and mounted to move up to tighten the drive belt and down to loosen the drive belt, control means operable to lift and hold the idler pulley up against the belt with variable pressure to tighten it for full speed or slip drive and releasable to allow the idler to move downwardly away from the belt, a brake controlling the main drive shaft and brake-actuating means connecting the idler pulley to the brake so that the weight of the idler pulley tightens the brake after the idler pulley control means are released, whereby upon release of the idler pulley the drive belt is loosened to disconnect the power input and the main drive shafts and the weight of the idler pulley serves to actuate the brake to stop the main drive shaft while the work-conveying means continues to be driven without interruption from the power input shaft.

2. A printing or like press comprising a power input shaft which rotates continuously during use of the press, work conveyor means, a connection from the power input shaft to the work conveyor means for driving the work conveyor means continuously, a main press drive shaft which rotates intermittently and at variable speeds independently of the work conveyor means during operation of the power input shaft, and driving connection and control means between the power input shaft and the main drive shaft comprising a pulley driven by the power input shaft, a pulley connected to rotate the main drive shaft, a friction drive belt passing around said pulleys, an idler pulley disposed beneath a portion of the belt extending between the first-mentioned pulleys, a control arm pivotally supported at its lower end, a link connecting the idler pulley and the control arm, a support arm swingable about a fixed axis, said axis being at a level between the extreme up-and-down positions of the idler pulley, the idler pulley being rotatably mounted on pivotally connected ends of the control and support arms and the link, which are arranged to draw up the idler pulley to tighten the belt with variable pressure to tighten it for full speed or slip drive as the control arm is swung upwardly and to let the idler pulley move down as the control arm swings back down again, releasable means to lock the idler pulley in a belt-tightening raised position, a brake controlling the main drive shaft, and brake-actuating means connected to and operable by the control arm during its downward movement, so that upon release of the locking means the drive belt is loosened to disconnect the power input and main drive shafts and the weights of the idler pulley, support arm and control arm serve to actuate the brake to stop the main drive shaft while the work-conveying means continues to be driven without interruption from the power input shaft.

3. A printing or like press comprising a power input shaft which rotates continuously during use of the press, work conveyor means, a connection from the power input shaft to the work conveyor means for driving the work conveyor means continuously, a main press drive shaft which rotates intermittently and at variable speeds independently of the work conveyor means during operation of the power input shaft, and driving connection and control means between the power input shaft and the main drive shaft comprising a pulley fixed on the power input shaft, a pulley connected to rotate the main drive shaft, a friction drive belt passing around said pulleys, an idler pulley movable against and away from the belt, a swingable control arm connected to move the idler pulley, and a group of connected control members pivotally mounted on the control arm and including a pawl, a ratchet mounted on a fixed portion of the press and cooperating with the pawl to lock the control arm, means resiliently urging the pawl against the ratchet, a rod slidably mounted on the control arm for movement against the group of control members to pivot the pawl out of engagement with the ratchet, and a lever engageable with the rod to disengage the pawl, said lever being mounted on the control arm with the pivot axis of the lever extending generally parallel to the line of movement of the control arm, whereby a hand grasping only the lever can operate the control arm to tighten the idler pulley on the belt with variable pressure for connecting the power input and main drive shafts for full speed or slip drive and can also operate the lever to release the control arm to loosen the idler pulley on the belt for disconnecting the power input and main drive shafts while the work-conveying means continues to be driven by the power input shaft.

References Cited in the file of this patent

UNITED STATES PATENTS

| Number | Name | Date |
|---|---|---|
| 100,651 | Merrick | Mar. 8, 1870 |
| 247,075 | Lazelere | Sept. 13, 1881 |
| 314,906 | Young | Mar. 31, 1885 |
| 386,297 | Chambers | July 17, 1888 |
| 1,226,297 | Bajett | May 15, 1917 |
| 1,339,099 | Busk | May 4, 1920 |
| 1,595,287 | Buss | Aug. 10, 1926 |
| 1,704,532 | Curtis | Mar. 5, 1929 |
| 1,727,933 | Mitchell | Sept. 10, 1929 |
| 2,069,595 | Thomas | Feb. 2, 1937 |
| 2,154,666 | Crane | Apr. 18, 1939 |
| 2,339,268 | Huffman | Jan. 18, 1944 |
| 2,377,522 | Ryan et al. | June 5, 1945 |
| 2,415,321 | Weiking | Feb. 4, 1947 |